Sept. 6, 1938. O. B. CRAMER ET AL 2,129,316
GO-CART FOR BABIES
Filed Sept. 26, 1936 3 Sheets-Sheet 3
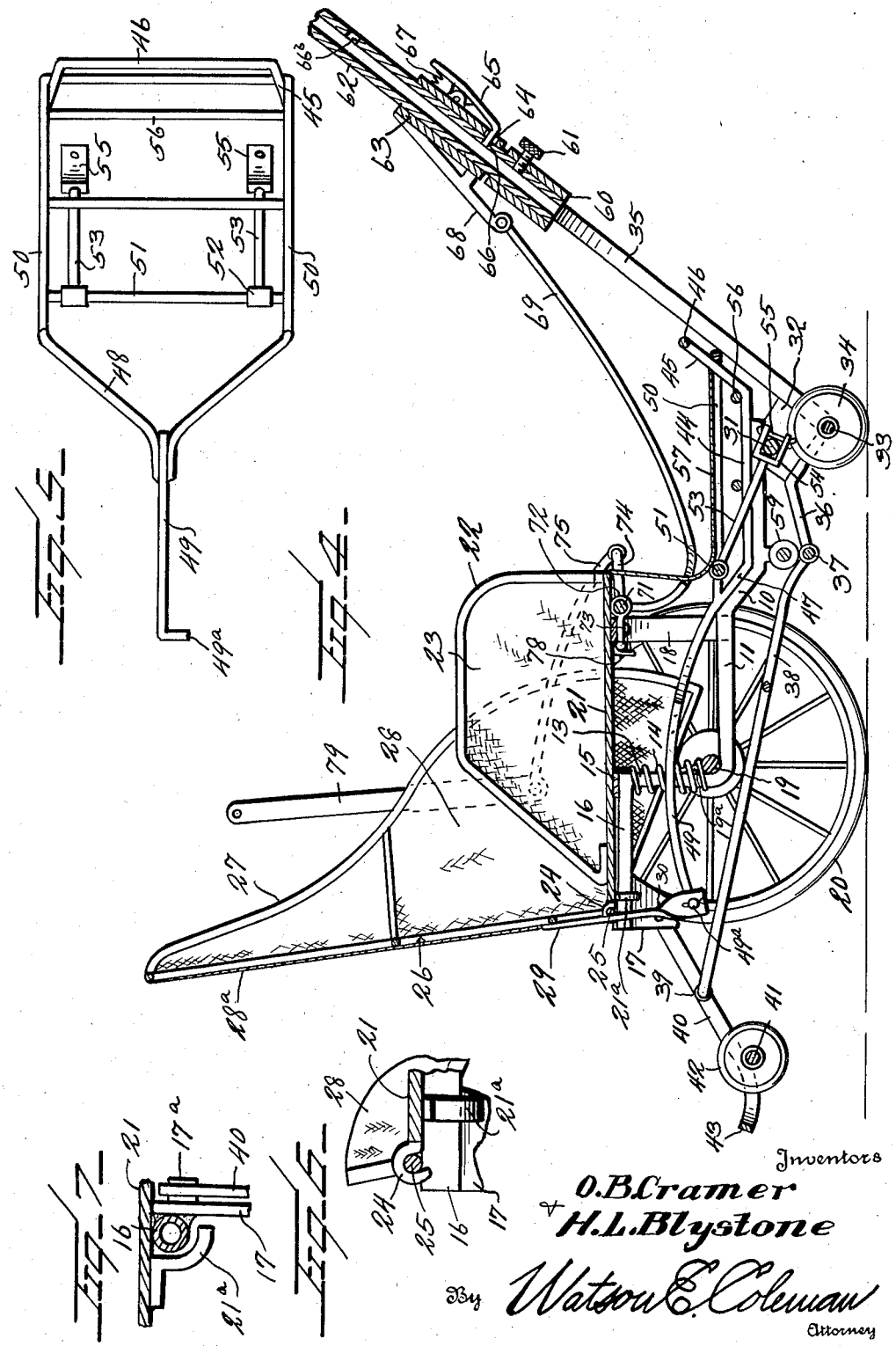
Inventors
O. B. Cramer
& H. L. Blystone
By Watson E. Coleman
Attorney Patented Sept. 6, 1938

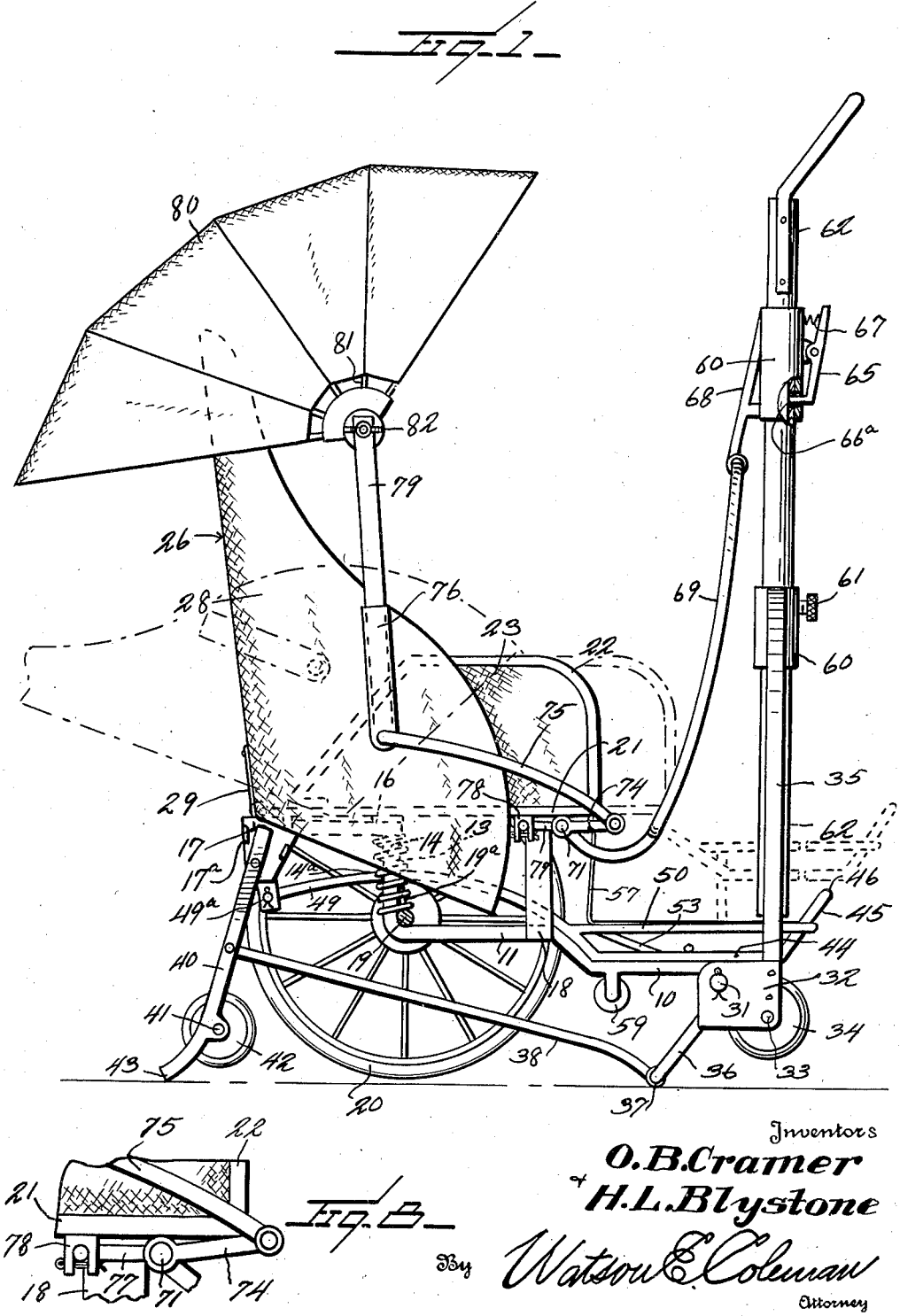

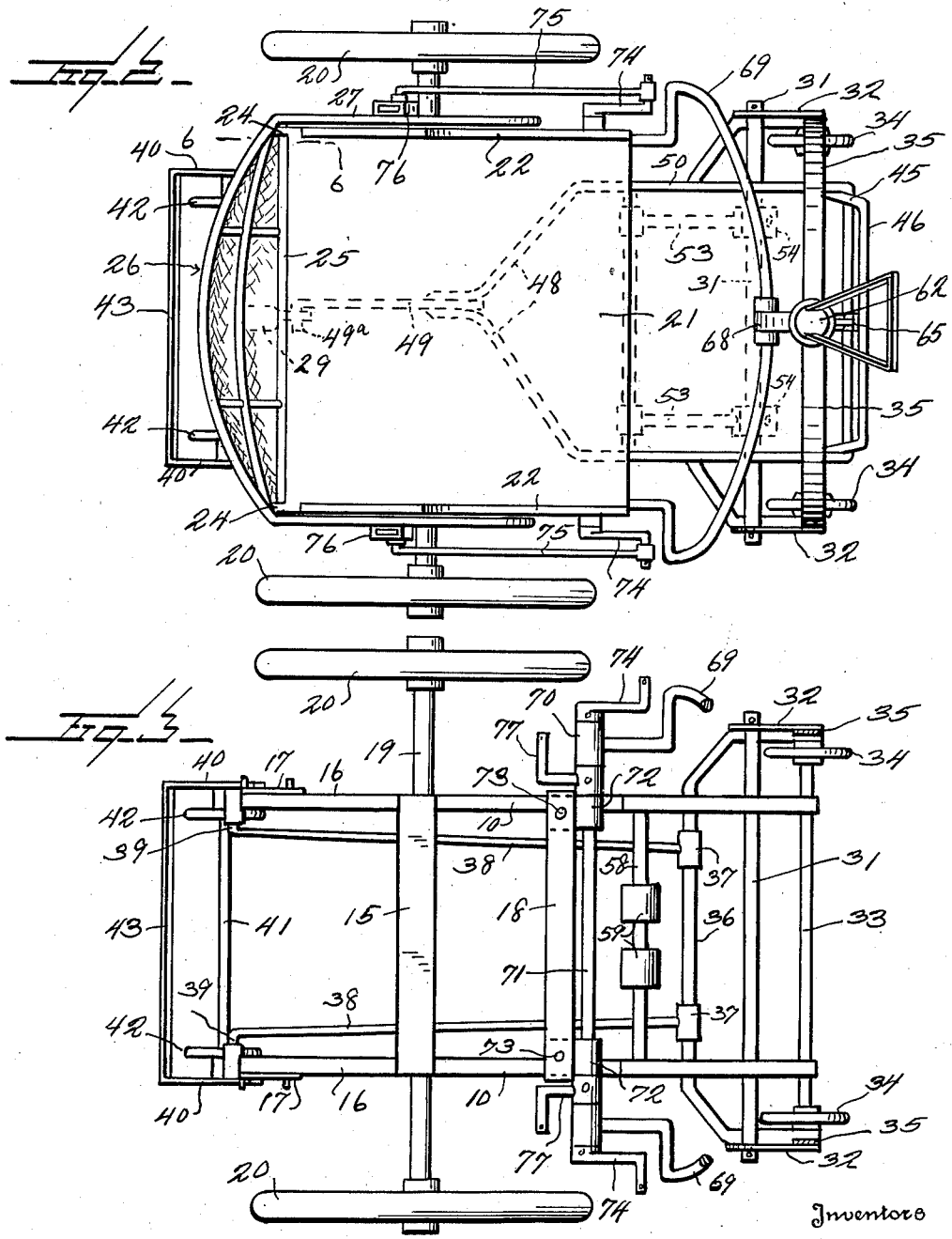

2,129,316

UNITED STATES PATENT OFFICE 2,129,316

GO-CART FOR BABIES

Olive B. Cramer, Sterling, Colo., and Henry L. Blystone, Pasadena, Calif.

Application September 26, 1936, Serial No. 102,758

13 Claims. (Cl. 280—36)

This invention relates to go-carts for babies and young children and particularly the go-carts including a wheeled body having a back and a seat, and a draft means for either pulling or pushing the body.

One of the objects of the invention is to provide a go-cart which combines a large variety of necessary useful features and particularly a cart which is light, durable and compact and can be adjusted in a simple manner.

A further object is to provide a draft tongue which may be raised to a vertical poistion or lowered to a pulling or pushing position, and which may be held in these positions by a latch.

A still further object is to so construct the go-cart that the actuation of the tongue will shift the parts of the cart either into a ground engaging position, which will prevent any rolling of the cart, or into a position where the cart is entirely supported by the wheels of the cart and can be readily propelled.

A further object is to provide rear and front curb wheels whereby the go-cart may be readily shifted up over curb stones or lowered down from the sidewalk onto a road, this construction further permitting the cart to be propelled up and down steps with relative ease.

A further and important object is to provide a cart which can be transported on the seat of an automobile with the child sitting in the cart.

A further object is to provide a seat assembly which includes a seat, a back and a foot rest which can be readily adjusted so that the child may recline within the cart.

Still another object is to provide an adjustable and detachable sun-shade and still another object is to provide a cart which, while not collapsible, is built in units to facilitate manufacturing and shipment, which can be assembled quickly and easily or readily knocked down for shipment or storage.

Other objects will appear in the course of the following description.

Our invention is illustrated in the accompanying drawings wherein:

Figure 1 is a side elevation of the cart with the draft tongue in a vertical position and all the wheels raised from the ground;

Figure 2 is a top plan view of the construction shown in Figure 1, but with the sun-shade omitted;

Figure 3 is a top plan view of the chassis of the cart;

Figure 4 is a vertical longitudinal sectional view of the cart but with the draft tongue lowered to a propelling position and the cart entirely supported by its wheels;

Figure 5 is a top plan view of the foot support or rest;

Figure 6 is a section on the line 6—6 of Figure 2 on an enlarged scale, showing the pivotal connection between the seat and back;

Figure 7 is a fragmentary section showing the manner in which the rear cross bar of the seat frame is slidably connected to the chassis frame;

Figure 8 is an enlarged elevation of the cranks for raising and lowering the seat.

Referring to these drawings, 10 designates each of two side bars which form the main element of what we will call the chassis or go-cart. Each bar 10 extends horizontally rearward from the front of the cart, then is upwardly inclined, then is extended horizontally to form a portion 11 which at its rear end is upwardly extended at 13. This portion 13 is again angularly bent or extended at 16 to extend rearward. The forward end of the portion 16 supports the cross bar 15 and surrounding each upwardly extending portion 13 is a spring 14. Attached to the rear end of each horizontal portion 16 of the frame is a downwardly extending bracket plate 17 which is welded to the end of the portion 16, and has the two stop lugs 17ª. Attached to the side bars 10 at the forward ends of the horizontal portions 11 thereof is the arch seat support 18. The members 10, 11, 14, 15 and 16 and the arch 18 constitute the chassis or running gear frame of the vehicle. An axle 19 rests upon the rear end of the portions 11 of the frame 10 at their junctions with the vertical portions 13. The axle 19 has upwardly extending lugs 19ª (see Figure 4) which extend upward into the lower ends of the coiled springs 14. The coiled springs 14 yieldingly resist the downward movement of the chassis relative to the axle 19. The axle 19 carries the main wheels 20. It will be seen that the chassis is yieldingly supported by the springs 14.

Supported on the horizontal portions 16, the cross bar 15 and the arch support 18, is a seat 21, to which are attached the two side elements or arm rests designated generally 22. Each element 22 constitutes a frame and attached to this frame is a web 23, which may be of sheet metal, woven fabric, woven rattan, laminated wood, or any other suitable material. The seat 21 may be of wood, metal or other suitable rigid material and at its rear corners, it is provided with downwardly opening hooks 24 which engage over the lowest cross bar 25 of a back frame designated generally 26, as shown more in detail in Figure 6.

The seat is also provided with the laterally extending curved members 21ᵃ which, as shown in Figure 7, engage beneath the portions 16. The back 26 is approximately rectangular in elevation and transversely curved, as shown in Figure 2. The frame of the back is continued forward on each side to form lateral wing frames, each carrying a web 28 of any suitable material. This material or web is also extended across the back frame 26, as at 28ᵃ. From Figure 1, it will be seen that the side wings of the back are extended downward and forward from the cross bar 25 and relative to the plane of the seat. Attached to the back frame 26 is a downwardly extending member 29 whose lower portion is twisted at 30 into the medial plane of the go-cart.

As shown in Figure 3, the forward ends of the side bars 10 carry a transverse shaft 31 which is welded to the bars 10. Shown as hingedly mounted on and by the ends of the shaft 31 are the two plates 32, the forward corners of these plates carrying a transversely extending axle 33 on which are mounted the wheels 34. Extending upward from the forward margins of these plates 32 is the draft arch 35 which is connected to and forms part of the tongue of the vehicle, as will be later described. Also attached to the plates 32 at its opposite ends is the angular yoke 36, whose medial portion extends transversely of the supporting bars 10 and then extends forward and is attached to the plates 32. This yoke is pivotally connected, as at 37, to the two rearwardly extending rods 38. These rods at their rear ends are angularly bent and pivotally connected to arms 40 which carry an axle 41 upon which are mounted the wheels 42. The extremities of these arms 40 are slightly curved upward and connected by a cross bar 43.

When the draft arch 35 is raised to a vertical position, as shown in Figure 1, the yoke 36 is rocked and the rear portion of the yoke is depressed and engages with the ground. This depression of the yoke 36 pulls on the rods 38, forcing the arms 40 downward until the cross bar 43 strikes the ground and this action lifts the wheels 42 and 34 clear of the ground and lifts the wheels 20 clear of the ground, so that the go-cart is then supported entirely by the cross bar 43 and by the cross bar of the yoke 36. In this position, as shown in Figure 1, the go-cart is frictionally engaged with the ground or floor and cannot be moved, except by lowering the arch tongue from the position shown in Figure 1 to that shown in Figure 4, which action raises the arms 40 and the wheels 42 as well, and lowers the wheels 34 so that the whole chassis is lowered and the go-cart rests upon the wheels 34 and the wheels 20. When the draft arch 35 is shifted into the position shown in Figure 4, the vehicle may be pulled or pushed, the position shown in Figure 4 being the propelling position.

Resting upon the forward portions of the side bars 10 are the two parallel longitudinally extending rods 44 of the foot rest. The forward ends of these rods 44 are upwardly inclined at 45 and these upwardly inclined ends are connected by a rod 46. The rods 44 at their rear ends extend upward, resting upon the upwardly inclined portions of the side members 10, as shown in Figure 4, and then extend immediately towards each other at 48, and connect to a single rearwardly extending rod or shank 49 having an angular terminal end 49ᵃ which engages with an eye in the lower twisted end of the iron 29 which is attached to the back, as heretofore described.

Just forward of the portions 48 of the foot rest, there are connected the rear ends of two horizontal rods 50 also forming part of the foot rest. Extending across these rods and carried thereby is the fixed shaft 51 and swingingly mounted thereon are the eyes 52 of connecting rods 53. Each of the connecting rods 53 is forked at its forward end, as at 54, to embrace shaft 31, the forks being held in place by cotter pins 55 passing through the forks. Cross rods 56 are attached to the rods 44. A webbing 57 of flexible material is attached to one of the cross rods 56 and extends rearward approximately to the shaft 50 and then extends upward and is attached to the forward edge of the seat 21. This web 57 may be stretched between the side rods 50, if desired and as shown, or it may rest loosely upon the cross bars 56.

The rearward movement of the back upon pivot 25 to the position indicated in Figure 1 by dotted line a, causes arm 29 to push forward on shank 49, in turn causing the arms 53 to rotate clockwise around the shaft 31. This lifts the foot rests upward, and at the same time, the foot rest or support will move forward. This rearward movement of the back is secured by the action of a crank arm 74, as will be later stated. The longitudinal bars 10 carry a transversely extending shaft 58 having rubber corks 59, which act as cushioning stops limiting the upward movement of the pivot joint 37 between the arms 36 and the connecting rods 38, and thus by stopping the downward swing of the tongue unit which includes the arch 35, allows the tongue unit to be used as a lever for tilting the cart up over curbs and steps. The rubber corks furnish tension to prevent the latch 65 from jiggling and also act as a cushion to prevent shock.

Draft arch 35 carries at its middle a tubular element 60 having a set screw 61, and into this element is disposed the draft tongue 62 which may be made of any suitable material and tubular or not. Set screw 61 engages this tongue 62. Sliding on tongue 62 is a sleeve 63, formed with an aperture 64 and pivotally mounted upon the sleeve is a latch 65 having an angularly bent extremity which projects through the aperture 64 and into an aperture 66 formed within the tongue. A spring 67 urges the latch to its engaging position. The upper portion of the tongue is also formed with a latching aperture 66ᵃ with which the latch may engage when the sleeve is shifted into the position shown in Figure 1. The tongue is also provided with a third aperture 66ᵇ which may engage with the latch 65 when the tongue stick 62 is slid downward through the sleeve 63 and through the tubular element 60 to prepare the cart for placing on an automobile seat with the child in the cart.

Hinged to this sleeve 63 by an angularly extending bracket 68 is an approximately U-shaped yoke 69, the arms of which are extended inward and then rearward and terminate in sleeves 70 which are loose upon a shaft 71. The yoke 69 with sleeves 63 and latch 65, acts as a brace to hold the tongue in a propelling position, as shown in Figure 4. The shaft 71 is mounted in bearings 72, each having a portion extending beneath the horizontal web of the arch 18 and is detachably bolted thereto by the bolts 73. This shaft carries at its extremities the crank arms 74 which extend forward and which are connected by connecting rods 75 to the wings 27 of the back. As illustrated, these connecting rods 75 at their ends are angularly bent and extended into the lower ends of socket members 76 which support the uprights of the hood or canopy.

Also mounted upon the shaft 71 are the rearwardly extending crank arms 77, the ends of which are angularly bent laterally and which engage with forked bearing members 78, as shown in Figure 1, the crank arm 77 being held in these bearing members by cotter pins or the like removable means.

The purpose of this shaft 71 with the cranks 74 and 77 and their connections, is to provide means whereby the back of the seat may be automatically tilted to an inclined position and the foot rest raised and moved forward relative to the seat and vice versa when the back is shifted to the position shown in Figures 1 and 4, the foot rest shall be retracted and lowered.

One advantage of the forward movement of the seat assembly on the chassis frame is to balance the weight of the child over the major wheels 20. While traveling, the cart is propelled with the weight of the occupant balanced over the major wheels 20 at all times.

The operation of this portion of the mechanism is as follows:

The operator places one hand on top of seat back 26 while at the same time he pushes down on the crank 74 with either hand or toe, thus overcoming gravity or the weight of the child. This causes crank shaft 71 to rotate about 180° clockwise. Crank 74 rotates downward and backward with the shaft 71. Crank 77 rotates upward and forward. The rotation of crank 74 causes the forward end of each side connecting link 75 to pass down over center and then upward and rearward and this pushes the back 26 toward a reclining position, as shown in dotted lines in Figure 1. Crank 77, which is connected to the seat frame at 78, lifts the seat upward and moves it forward. At the same time, the backward tilting of the back 26 with the advance on chassis frame of seat 21 causes the lower end of the iron 29 to move forward and upward and this causes the shank 49 to advance and push the foot rest upward and forward over the arc described by the upper ends of the rods 53. This brings the foot rest into approximate level with the seat when the seat has come to rest. This reclining action is a co-ordinated movement of all parts of the seat assembly and at no time is any member of the seat assembly independently at rest. All parts of the seat assembly move at the same time and come to rest at the same time.

To return the seat to its initial upright position, the operator merely lifts upward and forward on the seat back 26. This motion overcomes gravity and causes the connecting rods 75 to push the crank 74 back in reverse rotation towards their initial position, which is that shown in Figure 1. When this reverse rotation gets past the center of the arc, the weight of the child bearing downward on cranks 77, which are now also past the center, causes the seat to snap down on the chassis frame and also causes the rods 75 to once more take the position of pulling up over center. This constitutes an automatic latch, as it were, holding the back upright until the operator again chooses to change it to a reclining position. All of the parts return to their initial position at the same time because of the co-ordination of the several parts.

In order for the seat assembly to be reinstated into its initial upright position by a mere lift on the top of the seat back, we find it preferable to dispose each crank 74 so that it does not lie quite in the same plane as the crank 77 or, in other words, so that the crank 74 is a little above a horizontal line running through the crank 77 and shaft 71. This slight angularity of the cranks 74 and 77 is not clearly shown in Figure 1 and hence we have illustrated this in an exaggerated manner in Figure 7. This slight angularity of the crank 74 to the crank 77 causes the arms 75 to pull up more safely over the center when the seat is upright. Furthermore, when the seat assembly is reclined, the crank 74 lies below a plane or line passing through crank 77 and shaft 71. This, while supporting the reclined back 26, makes it easier for the arm 75 to push the crank 74 in reverse rotation when the operator lifts up and forward on the seat back.

The sun-shade or canopy is supported by two rods 79, one on each side of the wings 27, and inserted in the sockets 76 so that this sun-shade may be removed, if desired. The sun-shade itself is designated 80 and may be made of any suitable material having ribs 81 and having trunnions of an obvious construction engaging in the support 79, the sun-shade with its trunnions being rotatable around the axes of the trunnions and being held in adjusted position by the nuts 82, thus locking the sun-shade in any tilted position in which it is desired to place it. The sun-shade may be disposed forward of the back or directly over the seat or downward behind the back, as desired.

Attention is particularly called to the fact that in our construction, the weight of the child on the seat 21 holds the parts in either of their adjusted positions, that is, it either holds the seat and back in the position shown in Figure 4 or holds the seat and back in the position described, with the seat shifted forward, the back inclined at a greater angle than in Figure 4, and the foot rest raised as shifted forward. Of course, however, the crank 74 may be manipulated against the weight of the child, but when the hand is released from the crank, the weight of the child will hold the parts in their adjusted positions against any re-shifting movement.

The general operation of the mechanism has been heretofore described and it is not believed necessary to repeat it.

It will be seen that we have provided a cart which is particularly handy and has a combination of very useful features. The cart is light, durable, compact and can be operated quickly and adjusted quickly by a few simple motions. Whenever it is desired to raise or lower the tongue, the latch 65 is released and the tongue shifted to any desired position. To pull the cart forward up steps or up over a curb, the latch 60 is left in the pulling position, as shown in Figure 4. The operator tilts the cart backward and lifts on handle until the front curb wheels 34 engage on the top of the curb or tread of the step. Then the operator bears down on the tongue handle to tip the cart upward over wheels 34 until wheels 20 can roll forward on the walk or top of the steps and, of course, obviously a second step is negotiated in the same way. Obviously by depressing the tongue, the rear wheels 42 may be raised so that the cart may be backed up over a curb, the wheels 42 moving onto the upper face of the curb and then the cart may be lifted until the major wheels 20 ride upon the sidewalk.

By an easy adjustment of the parts, that is, by loosening the set screw 61 and sliding the tongue stick 62 downward as far as it will go through the tubular socket 63 and then tightening the screw 61, this cart can be placed in a car seat either with the child in it or without the child.

The cranks 74 may be used as the means for causing the forward movement of the seat, the rearward inclination of the back and the lifting of the foot rest and the reverse movement of these cranks 74 will act reversely to return the parts to the positions shown in Figures 1 and 4. By turning the tongue to a vertical position, as shown in Figure 1, the wheels are all lifted from the ground and the cart will then be supported entirely on the members 37 and 43, so that the cart is held stationary from any accidental movement.

It will be seen that the transformation of this cart from what may be termed a chair position, such as shown in Figure 1, to a propelling position, such as shown in Figure 4, is automatically accomplished by turning the tongue from its vertical position to its forwardly inclined position.

The cart is not collapsible but is built in units to facilitate manufacture and shipment. It will be seen that the seat with the back and sides may be readily removed from the chassis by springing the shank 49 out of its engagement with the iron 29 and removing the cotter pins from the bearings 78; then loosening the canvas web 57 from the cross bar of the seat frame, springing the upper ends of the rods 75 out of engagement with the sockets 76 and then sliding the seat backward off of the chassis frame whereby the back will drop off the seat and one part may be folded upon the other. Of course, the sun-shade is removable and the connecting rods 75 can be sprung out of engagement with the lower ends of the sockets 76. The foot support may also be lifted off of the chassis by removing the cotter pins 55.

In order to move the foot rest, the web 57 is unfastened from the front cross bar of the seat, as before stated. The shank 49 is sprung out from engagement with the irons 29, the cotter keys 55 holding the connecting rods 53 on the shaft 31 are removed and then the foot rest is bodily removed. To remove the rear curb wheel unit, the connecting rods 38 are sprung out of the sockets 39 and arms 40 are sprung out of the eye-holes in plate 17, thus permitting this unit to be removed. To remove the tongue arch unit, the tongue stock 62 is removed from the socket 63, the cotter pins 55 are removed from the ends of shaft 31, the arch 35 is shifted laterally back and forth on shaft 31 to enable the side plates 32 to become disengaged from the ends of the shaft. The tongue arch unit is then free.

In order to detach the yoke 69, the small bolts 73 are removed. By disassembling the several parts, as herein described, the parts are ready to pack together in a box for shipment. The main axle 19 with the wheels 20 pack just as well on the chassis as off but can be removed by merely compressing the springs 14 until the lugs 19a welded on the axle are released from engagement with the lower ends of the springs.

To assemble the car, the chassis is assembled by first springing on the rear curb wheel unit; then putting on the draft arch and inserting the cotter keys on shaft 31; then inserting the connecting bars 38 and sockets 39; putting on the yoke 69 with bolts 73 and inserting the tongue stick through sleeve 63 and into socket 60 and tightening set screw 61. This assembles the chassis. Then the foot rest is put on; then the yoke 69 attached; the back 26 is then connected on the seat and the seat is slid onto the rear of the frame; the shank 49 of yoke 48 is then sprung into engagement with the eyes 49a; the seat is then connected to the cranks 77 at the bearings 78; the rods 75 are engaged with the sockets 76; the sun-shade is then put on, and the go-cart is completely equipped to give the child a ride.

It will be seen that we have provided a go-cart which has all the advantageous features of other carts but though it is capable of being disassembled, it is not collapsible. The cart may be supported off of its wheels like a chair by a simple movement of the tongue or the cart may be shifted into a propelling position by simply operating the tongue. The go-cart will fit into the seat of an automobile or street car by a simple adjustment whether the child is in the go-cart or not. Again it may be transformed into a bed by a very simple adjustment in the manner heretofore described and be changed back into a chair position instantly by simply lifting up on the back. The parts automatically "latch" themselves into either position, as heretofore described. The tongue automatically latches into either upright or propelling position by the spring latch on the tongue. The cart can be propelled up and down steps by merely tilting it and can be assembled or disassembled readily and easily. The cart has only two bolts and seven cotter pins holding it together. The go-cart weighs sixteen pounds when fully equipped.

What is claimed is:

1. A go-cart, including a chassis, main wheels carried by the chassis and normally supporting the go-cart, ground engaging members carried by the chassis forward and rearward of the main wheels, a draft tongue connected to the chassis for vertical swinging movement, and means connected to and operated by the tongue for depressing both of the ground engaging supports to a position below the wheels and thereby elevating the wheels above the ground upon a movement of the tongue to an approximately vertical position and raising said ground engaging members to a position above the wheels when the tongue is swung to a pulling position.

2. A go-cart, including a chassis, a pair of main wheels carried by the chassis and normally supporting the go-cart, ground engaging members carried by the chassis, a draft tongue connected to the chassis for vertical swinging movement, means connected to and operated by the tongue for elevating the ground engaging members relative to the wheels when the tongue is depressed to a pulling position and depressing the ground engaging members to a position below the wheels upon a movement of the tongue to an approximately vertical position, and means for latching the tongue in either its raised or downwardly and forwardly inclined position.

3. A go-cart, including a chassis, wheels carried by the chassis and normally supporting the go-cart, ground engaging members carried by the chassis disposed forward and rearward of the main wheels, a draft tongue connected to the chassis for vertical swinging movement, means connected to and operated by the tongue for elevating the ground engaging members relative to the main wheels when the tongue is depressed to a pulling position and depressing the ground engaging members to a position below the main wheels upon a movement of the tongue to an approximately vertical position, means for latching the tongue in either its raised or downwardly and forwardly inclined position, including a sleeve mounted on the tongue for longitudinal movement therealong, means for latching the sleeve in any one of a plurality of positions along the tongue, and a connecting member between said sleeve and the chassis of the go-cart.

4. A go-cart, including a wheeled chassis, a seat slidingly supported on the chassis for longitudinal movement, a seat back pivoted to the rear of the seat, a foot support mounted upon the chassis for longitudinal movement and simultaneous upward movement, and manually operable means for shifting the seat forward, simultaneously tilting the back rearward and simultaneously raising and shifting forward the foot support.

5. A go-cart, including a wheeled chassis, a seat mounted upon the chassis for longitudinal sliding movement, a back operatively hinged to the rear end of the seat, a crank shaft operatively supported upon the chassis and having a crank arm disposed immediately beneath the seat, the shaft having an oppositely directed arm, the latter arm being operatively connected to the back on a level above its fulcrum of the back, the depression of the last named crank causing a rotation of the first named crank and the tilting and forward movement of the seat, the movement of the second named crank through its connection with the back causing a tilting of the back rearward relative to the seat.

6. A go-cart, including a wheeled chassis, a seat mounted upon the chassis for tilting movement and for longitudinal sliding movement, the seat tilting upon a fulcrum at the rear of the seat and forming part of the chassis, a back operatively hinged to the rear end of the seat, a crank shaft operatively supported upon the chassis and having a crank arm disposed immediately beneath and having a bearing engaging the seat, the shaft having an oppositely directed arm, the latter arm being operatively connected to the back at a level above the fulcrum of the back, the depression of the last named crank causing a rotation of the first named crank and the tilting and forward movement of the seat, the movement of the second named crank through its connection with the back causing a tilting of the back rearward relative to the seat, a foot support mounted upon the chassis for longitudinal and vertical movement, and means operatively connected to the back for shifting the foot support forward and elevating it as the back is tilted.

7. A go-cart, including a wheeled chassis, a seat mounted upon the chassis for tilting movement and for longitudinal sliding movement, the seat tilting upon a fulcrum at the rear of the seat and forming part of the chassis, a back operatively hinged to the rear end of the seat, a crank shaft operatively supported upon the chassis and having a crank arm disposed immediately beneath the seat and having a bearing engaging the seat, the shaft having an oppositely directed arm, the latter arm being operatively connected to the back at a level above the fulcrum of the back, the depression of the last named crank causing a rotation of the first named crank and the tilting and forward movement of the seat, the movement of the second named crank through its connection with the back causing a tilting of the back rearward relative to the seat, a foot support mounted upon the chassis for longitudinal and vertical movement, arms pivotally supported at their forward ends upon the chassis and at the rear ends pivotally engaged with said foot support, and means operatively connected to the back for shifting the foot support forward and thus causing the arms to simultaneously lift the foot support.

8. A go-cart, including a chassis, main wheels supporting the chassis, a draft tongue operatively pivoted to the forward end of the chassis for movement from a forwardly inclined position to a vertical position and carrying forward chassis-supporting wheels, the draft tongue comprising telescopic elements, a seat mounted on the chassis for longitudinal movement, a back hinged to the rear end of the seat, a foot rest mounted on the chassis for longitudinal and simultaneous vertical movement, and manually operable means for causing the forward movement of the seat, the successive tilting rearward of the back, and the forward and upward movement of the foot rest or the movement of said parts in a reverse direction.

9. In a go-cart, a chassis, a seat supported upon the chassis, a back hingedly supported relative to the seat, a foot support, and single means constructed and arranged to shift the back into a rearwardly inclined position relative to the seat, simultaneously shift the seat forward and simultaneously shift the foot support forward and upward toward the seat.

10. In a go-cart, a chassis including longitudinally extending members laterally spaced from each other, a seat operatively supported upon the chassis, a back hingedly supported at its lower end for movement into desired angular relation to the seat, an axle carried by the chassis, wheels carried by the axle, a draft arch pivotally mounted upon the chassis at its forward end and having a socket at its middle, a draft tongue detachably disposed within said socket, means for latching the draft arch to the tongue either in a vertical position or in a forwardly inclined position, a forward pair of wheels, forward and rear ground engaging members, and means operated by the tongue for depressing the ground engaging members and lifting all of said wheels from the ground when the tongue is turned to a vertical position or depressing said forward wheels and simultaneously lifting the ground engaging members when the tongue is turned to a forwardly inclined draft position.

11. A go-cart, including a chassis, an axle carried thereby and wheels mounted upon the axle, a pair of arms operatively pivoted to the chassis and extending rearward and downward therefrom and carrying a pair of wheels, a tongue, means depending below the chassis and attached to the tongue and pivotally connected to the chassis whereby the tongue may have swinging movement around the axis of said pivoting means from a vertical position toward a horizontal position, wheels carried by the lower end of the tongue and movable downward and rearward upon a swinging of the tongue from a vertical to a forwardly inclined draft position, and links pivotally connected to said rear arms and operatively connected to said tongue whereby to lift the rear pair of arms when the tongue is swung to an inclined position with the wheels at the lower ends of the tongue engaging the ground.

12. In a go-cart, a chassis, an axle, main wheels carried thereby, a rear pair of wheels, a tongue operatively pivoted to the forward end of the chassis, a pair of wheels carried by the tongue and movable downward into engagement with the ground upon a depression of the tongue to a downwardly and forwardly inclined position, and means operatively connecting the tongue with the rear pair of wheels, said means acting to raise the rear pair of wheels when the tongue is swung from a vertical position to a forwardly inclined position.

13. A go-cart including a chassis, an axle supported by the chassis, main wheels carried by the axle, a pair of arms operatively pivoted upon the rear end of the chassis rearward of said main wheels, a pair of wheels carried by said arms above the lower ends thereof, a draft tongue operatively pivoted upon the forward end of the chassis for swinging movement in a vertical plane, forward wheels carried by the draft tongue, a ground engaging member disposed forward of the main wheels, and means operatively connected to said arms and to the draft tongue for raising said arms and the wheels carried thereby upon a movement of the draft tongue to a forwardly inclined position and simultaneously depressing the forward wheels, said means acting upon a movement of the tongue from its forwardly inclined position to an approximately vertical position depressing said rear arms to bring their ends in engagement with the ground and simultaneously depressing the ground engaging member carried by the tongue to thus lift the main wheels and the auxiliary wheels off the ground and support the carriage upon the extremities of said arms and upon said ground engaging member.

OLIVE B. CRAMER.
HENRY L. BLYSTONE.